United States Patent
Stano et al.

(10) Patent No.: US 12,001,180 B2
(45) Date of Patent: Jun. 4, 2024

(54) CONDITION-BASED METHOD FOR MALFUNCTION PREDICTION

(71) Applicant: HITACHI ENERGY LTD, Zürich (CH)

(72) Inventors: Pawel Stano, Cracow (PL); Frank Kirschnick, Adliswil (CH)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 17/342,133

(22) Filed: Jun. 8, 2021

(65) Prior Publication Data

US 2021/0382447 A1    Dec. 9, 2021

(30) Foreign Application Priority Data

Jun. 8, 2020   (EP) .................................. 20178840

(51) Int. Cl.
| | | |
|---|---|---|
| G05B 17/02 | (2006.01) | |
| G01N 15/06 | (2006.01) | |
| G06N 7/01 | (2023.01) | |

(52) U.S. Cl.
CPC ......... *G05B 17/02* (2013.01); *G01N 15/0618* (2013.01); *G06N 7/01* (2023.01)

(58) Field of Classification Search
CPC .... G05B 17/02; G01N 15/0618; G06N 7/005; G06Q 10/0635; G06Q 10/04; G06Q 10/06393; G06Q 50/06; G06K 9/6297
See application file for complete search history.

(56) References Cited

U.S. PATENT DOCUMENTS

| | | | |
|---|---|---|---|
| 7,788,205 B2 | 8/2010 | Chalasani et al. | |
| 8,050,843 B2 | 11/2011 | von Hoff et al. | |
| 10,067,038 B2 | 9/2018 | Hou et al. | |
| 11,144,378 B2 | 10/2021 | Shapiro et al. | |
| 11,262,272 B2 | 3/2022 | Jung | |
| 2007/0265811 A1 | 11/2007 | Chalasani et al. | |
| 2014/0365191 A1* | 12/2014 | Zyglowicz | G06F 17/5009 703/7 |
| 2017/0236064 A1* | 8/2017 | Kirschnick | G06N 5/04 |
| 2018/0025126 A1 | 1/2018 | Barnard et al. | |
| 2020/0265331 A1* | 8/2020 | Tashman | G06N 7/005 |

(Continued)

FOREIGN PATENT DOCUMENTS

| | | |
|---|---|---|
| CN | 1837767 A | 9/2006 |
| CN | 105593864 A | 5/2016 |
| CN | 106844952 A | 6/2017 |

(Continued)

OTHER PUBLICATIONS

Yi, Sang-ri "Particle Filter Based Monitoring and Prediction of Spatiotemporal Corrosion Using Successive Measurements of Structural Responses", MDPI, Sensors, published Nov. 13, 2018 (Year: 2018).*

(Continued)

*Primary Examiner* — Catherine T. Rastovski
*Assistant Examiner* — Lal C Mang
(74) *Attorney, Agent, or Firm* — Slater Matsil, LLP (57) ABSTRACT

To perform a prognostic health analysis for an asset (11-13), a stochastic simulation is performed to obtain a prognosis for the evolution of the asset health state. The prognosis is updated based on sensor measurements using a particle filter.

21 Claims, 5 Drawing Sheets

(56) References Cited

U.S. PATENT DOCUMENTS

2021/0285997 A1    9/2021   Jarmolowitz et al.

FOREIGN PATENT DOCUMENTS

| | | |
|---|---|---|
| CN | 108803323 A | 11/2018 |
| JP | 2013152655 A | 8/2013 |
| JP | 2018500709 A | 1/2018 |
| JP | 2020076744 A | 5/2020 |
| WO | 2020020548 A1 | 1/2020 |
| WO | 2021249943 A1 | 12/2021 |

OTHER PUBLICATIONS

Zhang, Xiiaodong "An Integrated Approach to Bearing Fault Diagnostics and Prognostics", American Control Conference, IEEE, Jun. 8, 2005 (Year: 2005).*

Sikorska, J.Z., "Prognostic modelling options for remaining useful life estimation by industry", Elsevier, Mechanical Systems and Signal Processing 5 (2011) 1803-1836, published Dec. 4, 2010 (Year: 2010).*

"Calibration of Stochastic Computer Models Using Stochastic Approximation Methods", Jun Yuan et al., IEEE, Transactions on Automation Science and Engineering, vol. 10, No. 1, Jan. 2013. https://ieeexplore.ieee.org/stamp/stamp.jsp?tp=&arnumber=6213574 (Year: 2013).*

Si, Xiaosheng, et al., "A General Stochastic Degradation Modeling Approach for Prognostics of Degrading Systems With Surviving and Uncertain Measurements", IEEE Transactions on Reliability, vol. 68, No. 3, Sep. 2019, pp. 1080-1100.

Sikorska, J.Z., et al., "Prognostic modelling options for remaining useful life estimation by industry", Mechanical Systems and Signal Processing, vol. 25, Issue 5, Jul. 2011, pp. 1803-1836.

Yi, Sang-Ri, et al., "Particle Filter Based Monitoring and Prediction of Spatiotemporal Corrosion Using Successive Measurements of Structural Responses", Sensors, vol. 18, published Nov. 13, 2018, 18 pages.

* cited by examiner

CONDITION-BASED METHOD FOR MALFUNCTION PREDICTION

CROSS-REFERENCE TO RELATED APPLICATIONS

This application claims the benefit of European Patent Application No. 20178840.3, filed on Jun. 8, 2020, which application is hereby incorporated herein by reference.

TECHNICAL FIELD

The invention relates to techniques for assessing a health of an asset. The invention relates in particular to methods and devices for the prognostic assessment of asset health.

BACKGROUND

Electric power systems, such as power generation, transmission and/or distribution system, and industrial systems include assets. Transformers, power generators, and distributed energy resource (DER) units are examples for such assets. The assets are subject to degradation during operation. For planning purposes, scheduling maintenance or replacement work, it is desirable to perform an asset health analysis which is prognostic over at least a certain future prognostic time horizon, even when no sensor measurements are available for that time.

Simulation techniques can be used to simulate the time evolution of an asset. The parameters of such simulation techniques can be based on historical sensor data captured for a fleet of assets. The simulations provide a good picture for the overall statistical evolution of assets. For a large number of assets, the degradation process would statistically mimic the results obtained from the simulation. However, an individual asset may still exhibit a behavior that may deviate significantly from a prognosis that is obtained by the simulation technique.

Sang-ri Yi and Junho Song, "Particle Filter Based Monitoring and Prediction of Spatiotemporal Corrosion Using Successive Measurements of Structural Responses", Sensors 2018, 18, 3909 describes a framework to monitor and predict the spatiotemporal progress of structural deterioration using successive, indirect and noisy measurements. The framework adopts particle filter for the purpose of real-time monitoring and prediction of corrosion states and probabilistic inference of uncertain and/or time-varying parameters in the corrosion progress model.

X. Si et al., "A General Stochastic Degradation Modeling Approach for Prognostics of Degrading Systems With Surviving and Uncertain Measurements", IEEE TRANSACTIONS ON RELIABILITY, IEEE SERVICE CENTER, PISCATAWAY, NJ, US, vol. 68, no. 3, 1 Sep. 2019, pages 1080-1100, discloses a technique for estimating a remaining useful life (RUL). A maximum likelihood estimation framework is provided to determine model parameters based on an expectation maximization algorithm together with particle filtering and smoothing methods.

J. Z. Sikorska et al., "Prognostic modelling options for remaining useful life estimation by industry", MECHANICAL SYSTEMS AND SIGNAL PROCESSING, vol. 25, no. 5, 1 Jul. 2011, pages 1803-1836 discusses strengths and weaknesses of the main prognostics model classes.

SUMMARY

Embodiments of the invention relate to techniques for assessing a health of an asset. Particular embodiments relate to methods and devices for the prognostic assessment of asset health.

There is a need for enhanced techniques of monitoring the evolution of asset health. There is in particular a need for techniques that allow the prognostic predictions to be made for asset health while allowing sensor measurements to be incorporated as they become available. There is a need for techniques in which prognostic predictions for an asset health state can be updated using sensor measurements.

According to embodiments of the invention, methods and systems as recited in the independent claims are provided. The dependent claims define preferred embodiments.

According to embodiments of the invention, a particle filter (PF) technique is used to update a prognosis that is obtained by simulating a future evolution of the asset health state.

The future evolution may be based on a discrete Markov Chain model that may be used to predict the performance degradation of the asset. A Markov Chain Monte Carlo (MCMC) method may be employed to perform a large number of simulations. The Markov Chain model may have a set of discrete states that correspond to different asset health states.

MCMC techniques that employ a small state space and a small number of transition probabilities allow prognostic asset health analysis to be performed over various time horizons, including time horizons that may be several years or longer.

The model used in the stochastic simulation may be set up in such a way that only two or three transition probabilities govern the transitions between the states, which may be indicative of a healthy asset state, a degraded asset state in which the asset is still operative, and a failed asset state in which the asset has failed. The invention can also be applied to cases in which little or no historical data is available. The transition probabilities of the Markov Chain model may then be set by a human expert.

The PF may be used to update a probability of failure (PoF), remaining useful life (RUL), or other prediction about the health state of the asset.

A method of performing a prognostic health analysis for an asset which is a power system asset or an industrial asset comprises determining a future evolution of an asset health state of the asset, comprising iteratively repeating performing a stochastic simulation to obtain a prognosis for the future evolution of the asset health state, and updating the prognosis based on sensor measurements using a particle filter (PF). The method may comprise generating output based on the computed future evolution of the asset health state.

The method is a computer-implemented method.

The updating step may be triggered by a reading of the sensor measurements.

Performing the stochastic simulation may include running plural simulations in parallel to obtain a stochastic distribution for the asset health state as a function of time.

The stochastic simulation may use a model having a discrete state space, in particular a discrete Markov Chain model.

The Markov Chain may be homogeneous. The transition probabilities may be independent of time.

The Markov Chain may have order 1, i.e., transitions may be dependent on the state in which the Markov Chain model is currently, while being independent of previous transitions to that state.

The Markov Chain model may be such that states have qualitative interpretation that is monotonically ordered, i.e., it is always possible to compare two states in terms of severity of degradation.

Each state of the state space may have a non-zero transition probability to at most one other state of the state space, which describes more severe degradation, and non-zero transition probability to itself.

The Markov Chain model may be such that states of the state space that do not correspond to failure of the asset have a non-zero transition probability to just one other state of the state space.

The Markov Chain model may be such that a state of the state space that corresponds to failure of the asset does not have any non-zero transition probability to a state other than itself.

The Markov Chain model may be a finite Markov Chain model.

The state space may consist of n states where n is equal to three, four, or greater than four, wherein for n−1 states of the state space that correspond to an operative asset the transition probability to only one other state of the state space is non-zero, and for the state that corresponds to a failed asset there is no non-zero transition probability to any other state of the state space.

The stochastic simulation may comprise a MCMC simulation.

The discrete state space may consist of three states, four states, or more than four states.

The discrete state space may comprise at least one state in which operation of the asset is not adversely affected by a failure.

The discrete state space may comprise at least one state in which operation of the asset is adversely affected by a failure, but the asset continues to operate.

The discrete state space may comprise a state in which the asset is inoperative due to a failure.

Updating the prognosis may comprise mapping the sensor measurements to a scalar function, wherein different ranges of values of the scalar function correspond to the different states of the discrete state space.

The scalar function may be computed using heuristics that use sensor measurements as inputs and output the scalar function.

Updating the prognosis may comprise computing, based on the prognosis, an expectation value for an observable quantity included in the sensor measurements.

Updating the prognosis may comprise performing a comparison of the expectation value to the observable quantity included in the sensor measurements.

Updating the prognosis may comprise computing an updated initial state for a subsequent iteration of the stochastic simulation based on the comparison.

Updating the prognosis may be dependent on an uncertainty of the sensor measurements.

The expectation value may be computed based on a probability distribution in the discrete state space and state-dependent noise parameters.

The state-dependent noise parameters may be dependent on a variance of a noise term used to compute the expectation value.

The state-dependent noise parameters may be dependent on a state-dependent variance of Gaussian white noise.

The method may further comprise reading the sensor measurements in a cyclic manner and synchronously with completion of an integer number of simulation steps of the stochastic simulation. That is, an interval between successive sensor measurements may be different from any integer multiple of prediction cycles of the stochastic simulation.

The method may further comprise reading the sensor measurements asynchronously with completion of any integer number of simulation steps of the stochastic simulation. That is, an interval between successive sensor measurements may be different from any integer multiple of prediction cycles of the stochastic simulation.

Updating the prognosis may be dependent on an uncertainty inherent in the prognosis at the time at which the PF is invoked. For illustration, the distribution over all states of the state space may be used as input in the PF and may be updated. Execution of the PF may reduce the uncertainty inherent in the prognostic simulation. The uncertainty inherent in the prognosis may be varying.

The uncertainty inherent in the prognosis at a time at which the PF is executed may vary as a function of an interval lapsed since the PF was last executed.

The method may further comprise computing confidence information for the prognostic asset health state evolution from the stochastic simulation and updating the confidence information based on the sensor measurements.

The output may further be generated based on the confidence information.

The confidence information may comprise a future evolution of a confidence interval over the time horizon.

The method may further comprise computing variance information for the prognostic asset health state evolution from the stochastic simulation and updating the variance information based on the sensor measurements.

The output may further be generated based on the variance information.

The variance information may comprise a future evolution of a variance interval over the time horizon.

The confidence or variance information may comprise a future evolution of a lower boundary and a future evolution of an upper boundary.

Updating the confidence or variance information may comprise updating a stochastic distribution in the state space based on the sensor measurements, and recomputing the confidence or variance information for times following the time at which the sensor measurements using the updated stochastic distribution in the state space.

Updating the confidence or variance information may comprise reducing, by execution of the PF, a difference between the upper and lower boundaries.

Performing the stochastic simulation may comprise performing an integer number k of time evolution steps.

The PF may receive the prognosis obtained at the $k^{th}$ time evolution step of the stochastic simulation and the sensor measurements as input.

The PF may optionally receive an uncertainty associated with the sensor measurements as input.

The PF may compute an updated prognosis based on the prognosis obtained at the $k^{th}$ time evolution step, based on the sensor measurements, and optionally based on the uncertainty associated with the sensor measurements.

The PF may output an updated prognosis. The updated prognosis may be an updated distribution in the state space of the discrete model.

The updated prognosis may be used as initial value for the next k time evolution steps of the stochastic simulation.

The output may comprise a representation of the future evolution of the asset health state.

Alternatively or additionally, the output may comprise an alarm or warning generated based on the future evolution of the asset health state.

Alternatively or additionally, the output may comprise a control signal to control operation of the asset based on the future evolution of the asset health state.

The stochastic simulation may comprise simulations for different ambient and/or operating scenarios.

The stochastic simulation may comprise plural simulations that may be performed in parallel.

The stochastic simulation may comprise plural simulations that may be performed concurrently.

The method may be performed by at least one integrated circuit.

The method may be performed by at least one integrated circuit of a central controller of a decentralized control system.

The method may be performed by at least one integrated circuit of a local controller of a decentralized control system.

The method may comprise receiving, by the at least one integrated circuit, information on the transition probabilities of the model used in the stochastic simulation over a communication network.

The asset may be a power transformer, a distributed energy resource, DER, unit, or a power generator.

The asset may be installed in an electric power system or industrial system.

The electric power system or industrial system may have a decentralized control system comprising a central control and a plurality of local controllers, each associated with an asset of the electric power system or industrial system.

The method may be performed by a local controller of the decentralized control system.

A method of operating and/or maintaining an asset comprises performing a prognostic asset health analysis for the asset using the method according to an embodiment and automatically taking a control or output action based on the prognostic asset health analysis.

The control or output action may comprise performing at least one of the following: generating an alarm or warning generated based on the future evolution of the asset health state; generating a control signal to control operation of the asset based on the future evolution of the asset health state; scheduling a down-time of the asset based on the computed future evolution of the asset health state; scheduling maintenance or inspection work based on the computed future evolution of the asset health state; scheduling replacement work based on the computed future evolution of the asset health state; changing maintenance or inspection intervals based on the computed future evolution of the asset health state.

The control or output action may comprise outputting information on a failure probability as a function of operating time, on a scheduled or rescheduled maintenance work interval, or on a scheduled replacement work interval via an interface.

A computing system operative to perform a prognostic health analysis for an asset which is a power system asset or industrial asset comprises at least one integrated circuit operative to compute a future evolution of an asset health state of the asset by iteratively repeating a stochastic simulation to obtain a prognosis for the future evolution of the asset health state, and updating the prognosis based on sensor measurements using a particle filter (PF) technique. The at least one integrated circuit is operative to control generation of output based on the future evolution of the asset health state.

The computing system may include a local controller having one or several integrated circuit(s) (IC(s)) operative to iteratively repeat a stochastic simulation to obtain a prognosis for the future evolution of the asset health state and update the prognosis based on sensor measurements using the PF. The one or several IC(s) may be operative to perform the operations described in detail herein.

The computing system may include a central controller having one or several IC(s) operative to iteratively repeat a stochastic simulation to obtain a prognosis for the future evolution of the asset health state and update the prognosis based on sensor measurements using the PF. The one or several IC(s) may be operative to perform the operations described in detail herein.

The computing system may be operative such that the updating may be triggered by a reading of the sensor measurements.

The computing system may be operative such that performing the stochastic simulation may include running plural simulations in parallel to obtain a stochastic distribution for the asset health state as a function of time.

The computing system may be operative such that the stochastic simulation use a model having a discrete state space, in particular a discrete Markov Chain model.

The computing system may be operative such that the Markov Chain may be homogeneous. The transition probabilities may be independent of time.

The computing system may be operative such that the Markov Chain may have order 1, i.e., transitions may be dependent on the state in which the Markov Chain model is currently, while being independent of previous transitions to that state.

The computing system may be operative such that the Markov Chain model may be such that states have qualitative interpretation that is monotonically ordered, i.e., it is always possible to compare two states in terms of severity of degradation.

The computing system may be operative such that each state of the state space may have a non-zero transition probability to at most one other state of the state space, which describes more severe degradation, and non-zero transition probability to itself.

The computing system may be operative such that the states of the state space that do not correspond to failure of the asset have a non-zero transition probability to just one other state of the state space.

The computing system may be operative such that a state of the state space that corresponds to failure of the asset does not have any non-zero transition probability to a state other than itself.

The computing system may be operative such that the Markov Chain model may be a finite Markov Chain model.

The computing system may be operative such that the state space may consist of n states where n is equal to three, four, or greater than four, wherein for n−1 states of the state space that correspond to an operative asset the transition probability to only one other state of the state space is non-zero, and for the state that corresponds to a failed asset there is no non-zero transition probability to any other state of the state space.

The computing system may be operative such that the stochastic simulation may comprise a MCMC simulation.

The computing system may be operative such that the discrete state space may consist of three states, four states, or more than four states.

The computing system may be operative such that the discrete state space may comprise at least one state in which operation of the asset is not adversely affected by a failure.

The computing system may be operative such that the discrete state space may comprise at least one state in which operation of the asset is adversely affected by a failure, but the asset continues to operate.

The computing system may be operative such that the discrete state space may comprise a state in which the asset is inoperative due to a failure.

The computing system may be operative such that updating the prognosis may comprise mapping the sensor measurements to a scalar function, wherein different ranges of values of the scalar function correspond to the different states of the discrete state space.

The computing system may be operative such that the scalar function may be computed using heuristics that use sensor measurements as inputs and output the scalar function.

The computing system may be operative such that updating the prognosis may comprise computing, based on the prognosis, an expectation value for an observable quantity included in the sensor measurements.

The computing system may be operative such that updating the prognosis may comprise performing a comparison of the expectation value to the observable quantity included in the sensor measurements.

The computing system may be operative such that updating the prognosis may comprise computing an updated initial state for a subsequent iteration of the stochastic simulation based on the comparison.

The computing system may be operative such that updating the prognosis may be dependent on an uncertainty of the sensor measurements.

The computing system may be operative such that the expectation value may be computed based on a probability distribution in the discrete state space and state-dependent noise parameters.

The computing system may be operative such that the state-dependent noise parameters may be dependent on a variance of a noise term used to compute the expectation value.

The computing system may be operative such that the state-dependent noise parameters may be dependent on a state-dependent variance of Gaussian white noise.

The computing system may be operative for reading the sensor measurements in a cyclic manner and synchronously with completion of an integer number of simulation steps of the stochastic simulation. That is, an interval between successive sensor measurements may be different from any integer multiple of prediction cycles of the stochastic simulation.

The computing system may be operative for reading the sensor measurements asynchronously with completion of any integer number of simulation steps of the stochastic simulation. That is, an interval between successive sensor measurements may be different from any integer multiple of prediction cycles of the stochastic simulation.

The computing system may be operative such that updating the prognosis may be dependent on an uncertainty inherent in the prognosis at the time at which the PF is invoked. For illustration, the distribution over all states of the state space may be used as input in the PF and may be updated. Execution of the PF may reduce the uncertainty inherent in the prognostic simulation.

The computing system may be operative such that the uncertainty inherent in the prognosis may be varying.

The computing system may be operative such that the uncertainty inherent in the prognosis at a time at which the PF is executed may be vary as a function of an interval lapsed since the PF was last executed.

The computing system may be operative for computing confidence information for the prognostic asset health state evolution from the stochastic simulation and updating the confidence information based on the sensor measurements.

The computing system may be operative such that the output may further be generated based on the confidence information.

The computing system may be operative such that the confidence information may comprise a future evolution of a confidence interval.

The computing system may be operative for computing variance information for the prognostic asset health state evolution from the stochastic simulation and updating the variance information based on the sensor measurements.

The computing system may be operative such that the output may further be generated based on the variance information.

The computing system may be operative such that the variance information may comprise a future evolution of a variance interval over the time horizon.

The computing system may be operative such that the confidence or variance information may comprise a future evolution of a lower boundary and a future evolution of an upper boundary.

The computing system may be operative such that updating the confidence or variance information may comprise updating a stochastic distribution in the state space based on the sensor measurements, and recomputing the confidence or variance information for times following the time at which the sensor measurements using the updated stochastic distribution in the state space.

The computing system may be operative such that updating the confidence or variance information may comprise reducing, by execution of the PF, a difference between the upper and lower boundaries.

The computing system may be operative such that performing the stochastic simulation may comprise performing an integer number k of time evolution steps.

The computing system may be operative such that the PF may receive the prognosis obtained at the $k^{th}$ time evolution step of the stochastic simulation and the sensor measurements as input.

The computing system may be operative such that the PF may optionally receive an uncertainty associated with the sensor measurements as input.

The computing system may be operative such that the PF may compute an updated prognosis based on the prognosis obtained at the $k^{th}$ time evolution step, based on the sensor measurements, and optionally based on the uncertainty associated with the sensor measurements.

The computing system may be operative such that the PF may output an updated prognosis. The updated prognosis may be an updated distribution in the state space of the discrete model.

The computing system may be operative such that the updated prognosis may be used as initial value for the next k time evolution steps of the stochastic simulation.

The computing system may be operative such that the output may comprise a representation of the future evolution of the asset health state.

Alternatively or additionally, the computing system may be operative such that the output may comprise an alarm or warning generated based on the future evolution of the asset health state.

Alternatively or additionally, the computing system may be operative such that the output may comprise a control signal to control operation of the asset based on the future evolution of the asset health state.

The computing system may be operative such that the stochastic simulation may comprise simulations for different ambient and/or operating scenarios.

The computing system may be operative such that the stochastic simulation may comprise plural simulations that may be performed in parallel.

The computing system may be operative such that the stochastic simulation may comprise plural simulations that may be performed concurrently.

The computing system may have an interface to receive information on the transition probabilities of the model used in the stochastic simulation over a communication network.

The asset may be a power transformer, a distributed energy resource, DER, unit, or a power generator.

An electric power system or industrial system according to an embodiment comprises an asset and the computing system according to an embodiment to perform a prognostic asset health analysis for the asset.

The computing system may be a local controller of the electric power system or industrial system for controlling the asset.

The computing system may be operative for operating and/or maintaining the asset.

The computing system may be operative to generate a control or output action based on the prognosis on the asset health state evolution.

The computing system may be operative such that the control or output action may comprise performing at least one of the following: generating an alarm or warning generated based on the future evolution of the asset health state; generating a control signal to control operation of the asset based on the future evolution of the asset health state; scheduling a down-time of the asset based on the computed future evolution of the asset health state; scheduling maintenance or inspection work based on the computed future evolution of the asset health state; scheduling replacement work based on the computed future evolution of the asset health state; changing maintenance or inspection intervals based on the computed future evolution of the asset health state.

The computing system may be operative such that the control or output action may comprise outputting information on a failure probability as a function of operating time, on a scheduled or rescheduled maintenance work interval, or on a scheduled replacement work interval via an interface.

Various effects and advantages are associated with the invention.

The invention provides a novel application of Particle Filter (PF) techniques that allows asset health predictions to be automatically updated when new measurements become available for condition monitoring and failure prediction.

The method and systems according to embodiments of the invention provide long-short predictions in which a prognostic time horizon for the asset may be long (e.g., 1 week or more, 1 month or more, 1 year or more, 2 years or more, 5 years or more, 10 years or more, 15 years or more, 20 years or more, 25 years or more, 30 years or more), while the prognosis for the asset health state is intermittently updated using sensor measurements. Thereby, a long-short prediction is implemented. The update of the prognosis may be performed at intervals which may be variable. The intervals between successive updates may be determined by the availability of new sensor measurements that allow the asset health state to be estimated.

The automatic update of prognosis with new measurements may be performed even when the measurements are subject to uncertainty, which may be caused by, e.g., sensor quality flaws and/or noise.

Information on the health status may be obtained from measurement signals that are not directly related to the model used in the stochastic simulation, but which can be mapped to a health state. Predictions about the asset health may be computed in such a way that uncertainty inherent in the prognostic simulation and uncertainty about sensory measurements are balanced with each other.

Predictions can be updated asynchronously, e.g., with event-driven data protocols.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF ILLUSTRATIVE EMBODIMENTS

Exemplary embodiments of the invention will be described with reference to the drawings in which identical or similar reference signs designate identical or similar elements. While some embodiments will be described in the context of assets of a power system, such as distributed energy resource (DER) units or transformers, the embodiments are not limited thereto. The features of embodiments may be combined with each other, unless specifically noted otherwise.

Embodiments of the invention generally use a Particle Filter (PF) technique to update a prognosis for a future asset health state evolution obtained by a stochastic simulation based on sensor measurements. The stochastic simulation may involve performing a large number of simulations for asset health state degradation to obtain a stochastic distribution for the time evolution of the asset health state.

A hidden layer Markov model may be combined with a stochastic simulation approach in which the evolution of a system is estimated via statistical processing of stochastic trajectories generated with Monte Carlo method. Markov Chain evolution of observable states as determined by the stochastic simulation approach may be combined with sensor measurements captured during operation of the asset for which the asset health prediction is to be determined.

A combination of the Markov Chain evolution with Bayesian inference about an underlying malfunction that is not observable directly (hidden layer) may be used in the hidden layer Markov model.

Techniques that will be described in more detail below may include the following:

a) Initialization of a stochastic simulation. The stochastic simulation may be a Markov Chain Monte Carlo (MCMC) technique. The initialization may be dependent on information (e.g., sensor data) on the asset for which asset health evolution is to be determined.
b) Performing the stochastic simulation to obtain a prognosis for the evolution of the asset health state. This may involve cycling through a number k of time evolution steps of the MCMC.
c) Updating the prognosis based on sensor measurements using a PF technique. The PF may use the prognosis for the asset health state at the latest time prior to reading of the sensor measurements in combination with the sensor measurements to determine an updated prognosis. The updated prognosis may be an updated probability distribution for the states of the Markov model.
d) The updated prognosis is used as input for a new stochastic simulation; steps b and c may be repeated iteratively until a termination criterion is fulfilled.

The number of time evolution steps performed in step b before an updating based on sensor measurements is performed may vary between iterations. For illustration, in event-driven implementations, reading of sensor measurements may be event-driven. The updating of the prognosis may be performed when new sensor measurements are available. The updating of the prognosis may be triggered by new sensor measurements, which may be read via a push or pull mechanism.

Figure 1:
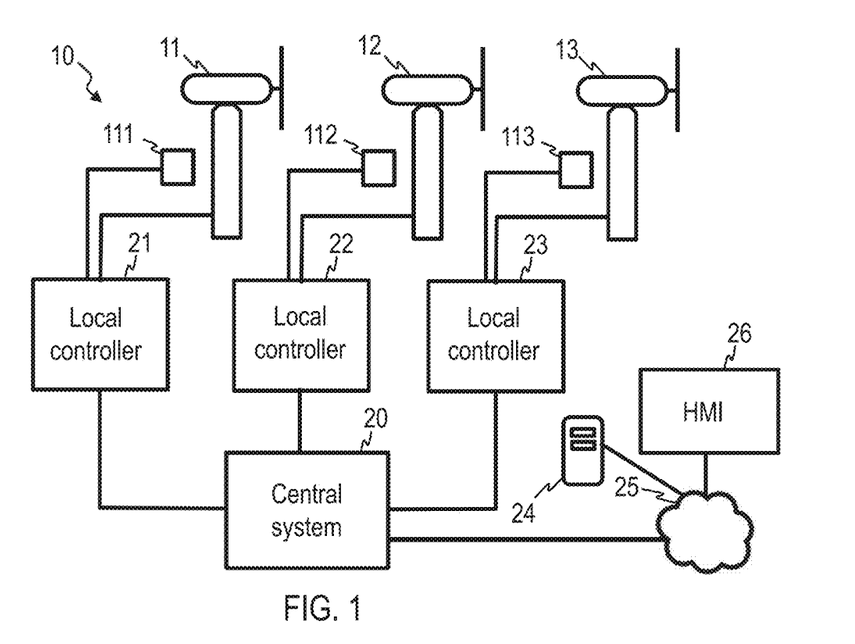
FIG. 1 is a schematic view of a power system having a computing system according to an embodiment.
Figure 2:
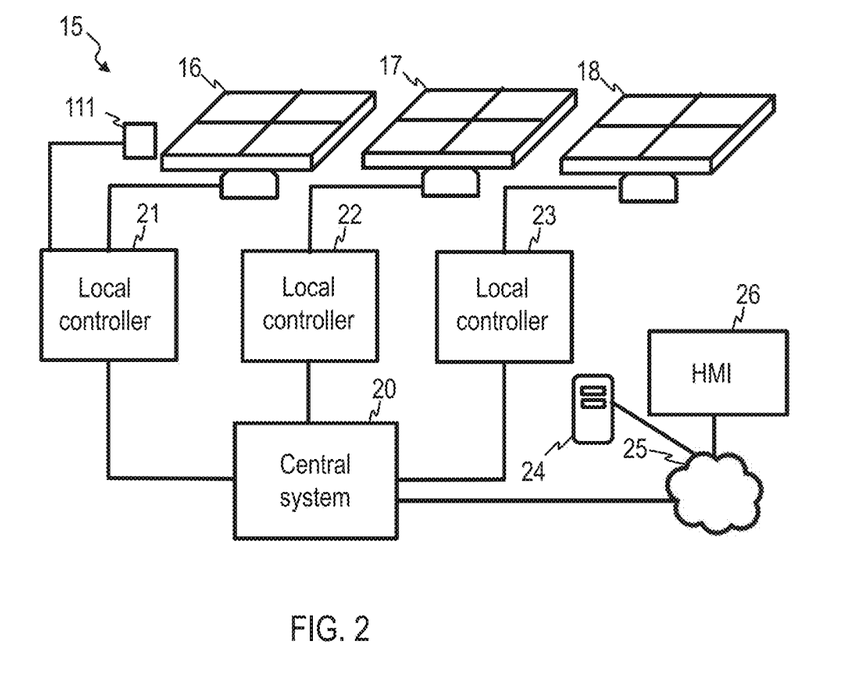
FIG. 2 is a schematic view of a power system having a computing system according to an embodiment.

FIGS. 1 and 2 are schematic views of a power system 10, 15. The power systems 10, 15 comprise a plurality of assets. The assets may include generators, such as distributed energy resource (DER) units 11-13, 16-18, transformers, or other electric power system assets.

The power system 10, 15 includes a control system comprising local controllers 21-23, each associated with an asset. The control system may include a central system 20. The central system 20 may be communicatively coupled with the local controllers. The central system 20 may be communicatively coupled with a remote (e.g., cloud-based) server system 24.

As will be described in more detail below, the local controllers 21-23, the central system 20, and/or the remote server system 24 may be operative to perform a prognostic asset health analysis, using a stochastic simulation based on a Markov Chain model in combination with a PF technique. The Markov Chain model may have a specific configuration, as will be explained below. The local controllers 21-23, the central system 20, and/or the remote server system 24 may be operative to perform a plurality of independent stochastic simulations, in particular a Markov Chain Monte Carlo (MCMC) simulation, to determine a prognosis for the evolution of the asset health state. The prognosis for the evolution of the asset health state are updated based on sensor measurements that may be read from sensor(s) 111-113 via a push or pull mechanism, using a PF.

Results of the prognostic asset health analysis as updated by the PF may be used by the local controllers 21-23, the central system 20, and/or the remote server system 24 for scheduling down-times, maintenance work, replacement work or for automatically performing control operations. The local controllers 21-23, the central system 20, and/or the remote server system 24 may be operative to generate and output control or output data. Output may be provided via a human machine interface (HMI) 26. The HMI may be coupled to the local controllers 21-23, the central system 20, and/or the remote server system 24 via the internet or another wide area network (WAN).

As will be explained in more detail with reference to FIG. 3 to FIG. 11, the prognostic asset health analysis may involve simulating time-evolution of an asset and updating of the simulation based on sensor measurements, using a PF. The MCMC simulations, updating based on sensor measurements using a PF, and further processing of the MCMC results as updated by the PF may be performed at the local controllers 21-23. This facilitates the incorporation of local sensor measurements for updating the prognostic asset health analysis.

The techniques described herein may be initiated at a time at which no sensor data is available for the asset, yet. For illustration, a remaining useful life (RUL) curve or other prognostic asset health prediction may be computed for assets even while no sensor measurements are available, yet, using transition probabilities dictating the transitions between discrete states of a state model used in the stochastic simulation. The transition probabilities may be set by a human expert or may be derived from historical data captured on assets of the same or similar type as the asset for which the prognostic asset health analysis is being performed.

It will be appreciated that the techniques described below may be performed in parallel and concurrently for several different assets 11-13, 16-18 of the electric power system or industrial system.

For illustration, a first computing device (e.g., the local controller 21) may perform a stochastic simulation to obtain a prognosis for the evolution of the asset health state of a first asset 11, 16 and update the prognosis, using a PF, based on sensor measurements obtained by one or several first sensors 111 for the first asset 11, 16.

A second computing device (e.g., the local controller 22) may perform a stochastic simulation to obtain a prognosis for the evolution of the asset health state of a second asset 12, 17 and update the prognosis, using a PF technique, based on sensor measurements obtained by one or several second sensors 112 for the second asset 12, 17.

A third computing device (e.g., the local controller 23) may perform a stochastic simulation to obtain a prognosis for the evolution of the asset health state of a third asset 13, 18 and update the prognosis, using a PF technique, based on sensor measurements obtained by one or several third sensors 113 for the third asset 13, 18.

The different stochastic simulations may be initialized differently, depending on the initial health state of the assets 11-13, 16-18. The initialization can be probabilistic. For illustration, if the information available is not conclusive whether the asset is in a first state or a second state of a state space used in the stochastic simulation with equal chances to be in either of these states, the system can be initialized with a Bayesian prior distribution such that probability of the asset being in the first state equals 50% and probability of the asset being in the second state equals 50%. Other probabilistic initiations with more states and different probabilities may also be possible.

The transition probabilities between different states of a state space used in the stochastic simulation may be the same for the various assets 11-13, 16-18 or may be different from each other. For illustration, if the first asset 11, 16 and the second asset 12, 17 are operated at different operating conditions and/or ambient conditions, the transition probabilities between the states of a discrete state space used in the simulation may be different from each other.

The state space used in the stochastic simulation may be the same for the various assets 11-13, 16-18.

The intervals at which the prognosis for the various assets is updated may be different. For illustration, a time interval between successive executions of the PF for updating the prognosis for the first asset 11, 16 may be different from a time interval between successive executions of the PF for updating the prognosis for the second asset 12, 17 and/or from a time interval between successive executions of the PF for updating the prognosis for the third asset 13, 18.

Figure 3:
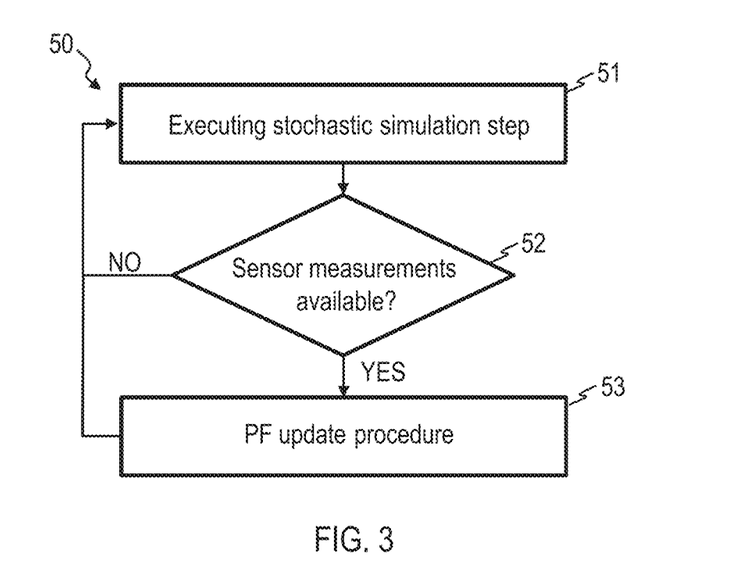
FIG. 3 is a flow chart of a method according to an embodiment.

FIG. 3 is a flow chart of a method 50. The method 50 may be performed automatically by one or several integrated circuits (IC(s)) in the local controllers 21-23, the central system 20, and/or the remote server system 24.

At step 51, a stochastic simulation step may be performed. The stochastic simulation step may include updating a state of many simulations that are executed in parallel, using transition probabilities between discrete states of a state space. The state space may have a finite number of states corresponding to increasingly severe degradation of the asset. The stochastic simulation step may include executing a time evolution step in many simulations that are performed in parallel in a MCMC technique.

At step 52, it is determined whether a sensor measurement is available. The sensor measurement may be received by a push or pull mechanism. Event-based reporting may be used, in which sensor measurements are read in response to a trigger event. If no sensor measurement is available, the next simulation step is performed at step 51.

At step 53, if a sensor measurement is available, the PF is used to update the most recent prognosis obtained by the stochastic simulation. This may involve updating a stochastic distribution obtained in the stochastic simulation based on the measurement and/or updating a quantity derived therefrom (such as remaining useful life (RUL), probability of failure (PoF) etc.).

Steps 51-53 are repeated iteratively. The number of stochastic simulation steps 51 performed prior to an update using the PF may vary from one iterative repetition to the next one.

The stochastic simulation may provide a stochastic distribution for the asset to be in one of plural different states of a state space. The stochastic simulation, as updated by the PF based on sensor measurements, may be used to derive a scalar function that is indicative of the evolution of the asset health state. The scalar function may be indicative of the probability for the asset to be in a critical failure state at a time in the future. The scalar function may be a degradation index that quantifies the degradation of the asset health, which may be computed from the probabilities for the asset to be in the different states of the state space. The scalar function or information derived therefrom may be output via the HMI 26 or may be used for an automatic control operation.

Figure 4:
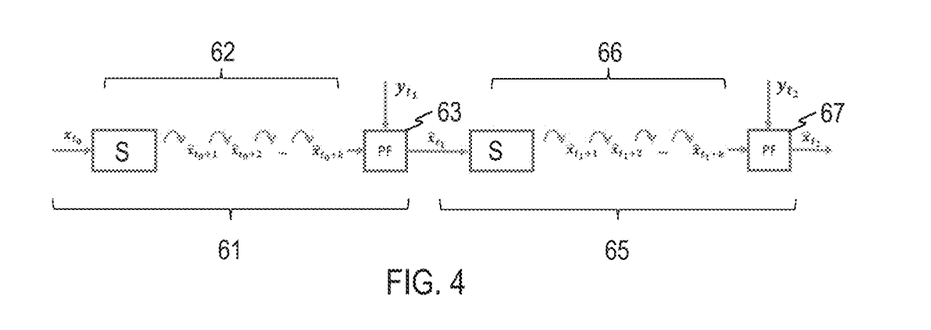
FIG. 4 is a diagram representing operation of a method according to an embodiment.

FIG. 4 illustrates operation of the combination of stochastic simulation and updates based on sensor measurements using a PF.

A stochastic simulation S is initialized at a time $t_0$. A k-steps ahead prediction 62 is obtained using a stochastic simulation. The stochastic simulation predicts a probability distribution for the asset to be in the states of a discrete state space for each of the k simulation steps $x_{t0+1}, x_{t0+2}, \ldots x_{t0+k}$. When sensor measurements are available at a time $t_1$, the predictions are corrected by the PF 63 with the most recent measurement ($y_{t1}$). The stochastic simulation determining the—steps ahead predictions 62 and PF 63 form an iteration 61 of the iterative process. A time interval $t_1$-$t_0$ may, but does not need to be an integer multiple of the time interval that corresponds to one predictive evolution step in the stochastic simulation.

Subsequently, the process is repeated. The stochastic simulation S is initialized using the updated prediction. The updated prediction depends on both the k-steps ahead prediction $x_{t0+k}$ and the sensor measurements $y_{t1}$. A k-steps ahead predictions 66 is obtained using a stochastic simulation. The stochastic simulation predicts a probability distribution for the asset to be in the states of a discrete state space for each of the k simulation steps $x_{t1+1}, x_{t1+2}, \ldots x_{t1+k'}$. When sensor measurements are available at a time $t_2$, the predictions are corrected by the PF 67 with the most recent measurement ($t_{t2}$). The stochastic simulation determining the—steps ahead predictions 66 and PF 67 form an iteration 65 of the iterative process. A time interval $t_2$-$t_1$ may, but does not need to be an integer multiple of the time interval that corresponds to one predictive evolution step in the stochastic simulation.

The number k' of prediction steps in the iteration 65 may be different from the number k of prediction steps in the iteration 61.

The PF is a nonparametric Bayesian filtering technique. The PF may be based on a Monte Carlo importance sampling approach, which can be applied to processes modeled by Hidden Markov Models (HMMs). The PF may be used to estimate the posterior distribution of the hidden states of the system from the measurements of an observable via recursive Bayesian inference. The estimate may be obtained in the form of a collection of tuples {particle: weight}, called samples, that represent empirical probability distribution (histogram), which approximates the true posterior distribution of hidden HMM states.

At each filtering step multiple samples need to be obtained from a so-called importance distribution to predict the evolution of the dynamic system. When new observation of the HMM system becomes available, the samples can be updated via Bayesian inference. The PF is a recursive technique that follows predict-update paradigm. A point estimate of the system state is obtained from the samples (collection of tuples {particle: weight}) by computing a weighted average of the particles.

Figure 5:
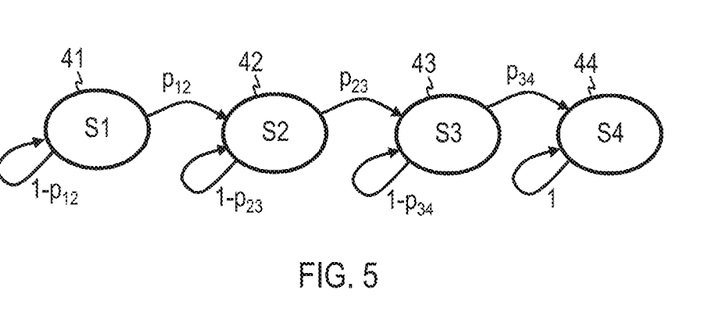
FIG. 5 is a Markov Chain model used in an embodiment.

FIG. 5 is a graph of a Markov Chain model that can be used in methods and computing systems according to embodiments. A state space of the Markov Chain model consists of a set of n states S1, ..., Sn. In the present case, n=4. However, a state space having a different number of states (e.g., n=3 or n=5 or n>5) may be used instead.

The states of the state space may be ordered in such a manner that a severity of degradation of the asset health increases from S1 to S2, from S2 to S3, etc. That is, all but the last state of the Markov Chain model may be followed by another state that represents a more severe degradation. The last state of the Markov Chain model may represent the most severe degradation.

The Markov Chain model may be set up in such a way that the $1^{st}, 2^{nd}, \ldots (n-1)^{th}$ state 41-43 have a non-zero transition probability $p_{12}$, $p_{23}$, $p_{34}$ to just one other state of the state space. The $n^{th}$ state 44 does not have a non-zero transition probability to a state other than itself.

For illustration, the Markov Chain model may be such that there is a finite transition probability $p_{12}$ from the first state 41 to the second state 42, but a zero transition probability from the second state 42 back to the first state 41. With probability $1-p_{12}$, the first state 41 is maintained in an iteration of the stochastic simulation.

The Markov Chain model may be such that there is a finite transition probability $p_{23}$ from the second state 42 to the third state 43, but a zero transition probability from the third state 43 back to the second state 42. With probability $1-p_{23}$, the second state 42 is maintained in an iteration of the stochastic simulation.

The Markov Chain model may be such that there is a finite transition probability $p_{34}$ from the third state 43 to the fourth state 44, but a zero transition probability from the fourth state 44 back to the third state 43. With probability $1-p_{34}$, the third state 43 is maintained in an iteration of the stochastic simulation.

The final state 44 of the Markov Chain model may correspond to a state in which the asset has failed to such a degree that it is no longer operative.

The other states 41-43 of the state space may correspond to different degrees of degradation.

For illustration, a first state 41 (which may also be referred to as "unknown" state S1) may correspond to an asset state in which there is no known degradation that would affect asset operation. For illustration, the first state 41 may correspond to a state in which no failures are recorded or in which no failures can be recorded.

A second state 42 (which may also be referred to as "incipient" state S2) may correspond to a detectable failure that are of such minor severity that they do not immediately affect the asset's performance. Such incipient failures are usually characterized by short Mean Time to Repair (MTTR), low repair costs, and low impact on overall performance. If not maintained properly, the incipient failures can evolve into more severe degraded failures.

A third state 43 (which may also be referred to as "degraded" state S3) may correspond to a mode that describes failures that significantly reduce the system's performance but do not lead to immediate asset shutdown. Usually such failures are caused by components deterioration. If left untreated, the degraded will eventually lead to the critical failure.

The fourth state 44 (which may also be referred to as "critical" state S4) may correspond to the most severe failure mode that causes an immediate and complete shutdown of the asset. It is usually characterized by long and costly (due to complete production loss) MTTR.

The transition probabilities of the Markov Chain model may be received via a user interface from a human expert or may be determined using historical data, as will be described below. Various sets of transition probabilities $p_{12}$, $p_{23}$, $p_{34}$ may be used. For illustration, N>1, in particular N>2 different sets of transition probabilities $p_{12}$, $p_{23}$, $p_{34}$ may be used to simulate the evolution of the asset health state under different ambient and/or operating conditions.

When initializing the stochastic simulation to obtain a prognosis for the evolution of the asset health state, an initial state for the stochastic simulation may be selected depending on information on the asset is available. If no information on the asset is available, the simulations may all start with the first state 41 in which there is no information on detectable failures. If information on the asset is available, e.g. sensor data collected after installation, this sensor data may be used for initializing the simulations. A distribution of initial states for the various MCMC or other stochastic simulations may be selected depending on whether the already collected sensor data indicates that there is no recognizable failure that affects asset performance or whether there are detectable issues that affect asset performance.

Furthermore, the initialization can be probabilistic, as has been explained above.

Figure 6:
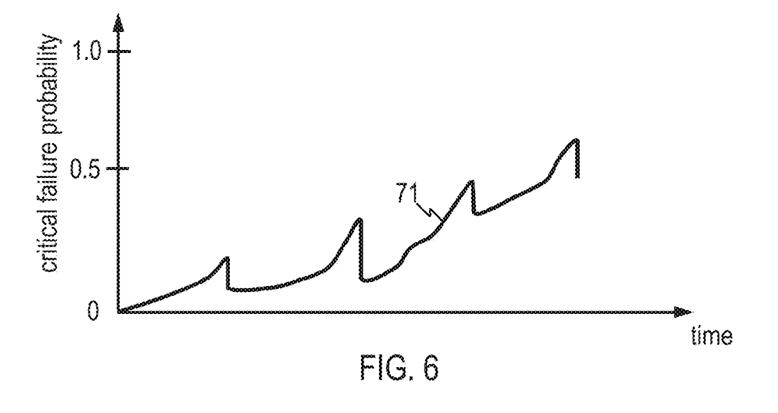
FIG. 6 is a graph illustrating exemplary output generated by a method and computing system according to an embodiment.

FIG. 6 is a schematic view of an output 71 that may be automatically generated and output. The output 71 may indicate the probability that the Markov Chain model, as updated using the PF based on sensor measurements, has evolved into the critical state that corresponds to an inoperative asset. The output 71 may be determined by computing the fraction of simulations in which the Markov Chain model is in the critical state S4 of the state space.

Additional or alternative output may be generated. For illustration, a RUL curve or other information indicative of the asset's degradation may be processed to automatically schedule inspection, maintenance, or replacement work, to output the schedule information to an operator and/or to automatically schedule down-times.

Alternatively or additionally, the RUL curve or other information indicative of the asset's degradation may be processed, using threshold comparisons or other triggers, to determine whether and when alarms, warnings, or other signals are to be output to the operator.

As illustrated in FIG. 6, the update based on sensor measurements by the PF may cause jumps in the probability distribution of the MCMC, the RUL curve, the PoF curve, or other information indicative of the evolution of the asset health state.

While a stochastic simulation, e.g. a MCMC, provides a good picture for the degradation of the asset health in a large set of assets of the same type, the combination of stochastic simulation with a PF to update the prognosis allows prognostic asset health analysis to be improved in an asset-specific manner.

Figure 7A:
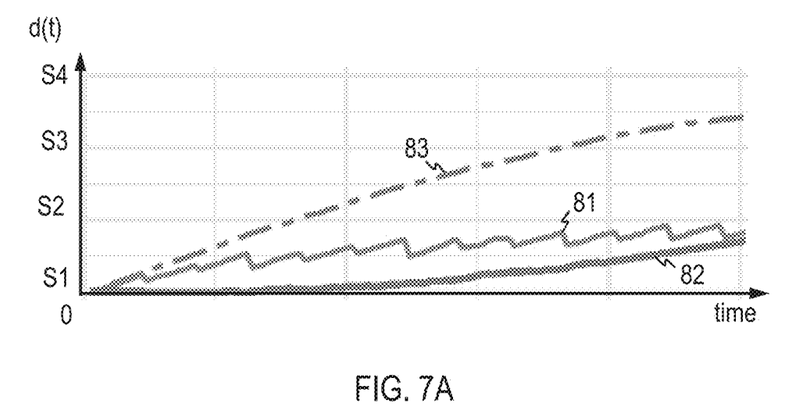
FIGS. 7A, 7B, and 7C are graphs illustrating results of a prognostic asset health state analysis in combination with observed asset health states.
Figure 7B:
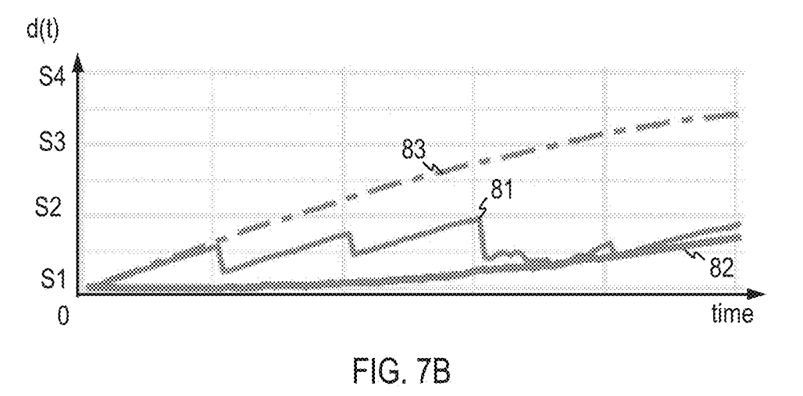
Figure 7C:
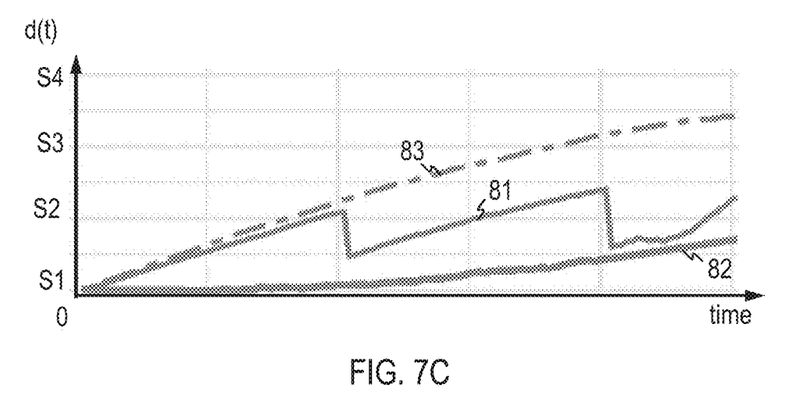

FIGS. 7A, 7B, and 7C illustrate the time evolution of an asset health state.

In FIGS. 7A, 7B, and 7C, there is shown a scalar function d(t) that represents the degradation. The scalar function d(t) depends on all probabilities $p_1$, $p_2$, ... $p_n$ for the Markov Chain model to be in the respective $1^{st}$, $2^{nd}$, ... $n^{th}$ state, as determined by the stochastic simulations updated by the PF.

For illustration, for anytime j, a scalar function $$d(j)=\Sigma_{i=1,\ldots,n}p_i(j)\times m_i \tag{1}$$

may be computed, where $p_i(j)$ designates the probability for the Markov Chain model to be in the $i^{th}$ state at time j, as determined by the stochastic simulations, and where $m_i$ denotes a scalar value that is a monotonous, in particular strictly monotonous, function of state label i. For illustration, all $m_i$ may be selected from an interval such that $m_1 \leq m_2 \leq \ldots \leq m_n$, in particular such that $m_1 < m_2 < \ldots < m_n$.

By outputting the function d(j) or information derived therefrom, a degradation that results in reduced RUL may be reflected more adequately even if it has not yet resulted in the asset reaching the critical state S4.

The function d(j) is indicative of a degradation and can be related to a health index h(j) by h(j)=1−d(j), when d(j) is constrained to take values between 0 and 1.

FIGS. 7A, 7B, and 7C show a time evolution of the asset health state, as measured by d(t). Curve 81 corresponds to the time evolution determined in accordance with the inventors, by combining stochastic simulations with sensor-reading based updated using a PF. Curve 82 corresponds to the real time-evolution of the respective asset. Curve 82 is obtained by processing plural sensor measurements into a degradation function 82. Curve 83 corresponds to the time evolution determined by stochastic simulations without any sensor-reading based updated using a PF.

In FIGS. 7A, 7B, and 7C, the data for determining curve 82 is captured for an asset that degrades much more slowly than the average. Thus, there is pronounced difference between the curve 83 obtained by stochastic simulations without any sensor-reading based updated using a PF and the curve 82 that represents the real degradation.

By incorporating sensor measurements using a PF into the prognosis, the resultant curve 81 much more closely mimics the real evolution of the asset health state.

When the stochastic simulation is based on a model having a discrete state space, combining sensor measurements with the stochastic simulation to obtain an updated prognosis may involve a translation between continuous observables or the degradation index d(t) derived therefrom and the discrete states of the state space. This may be done in various manners. For illustration, a degradation index d(t) or a health index h(t)=1−d(t) may be computed based on the sensor measurements as they become available. The degradation index d(t) or health index h(t)=1−d(t) computed from the sensor measurements may be compared to several thresholds $TH_1, \ldots TH_{n-1}$. The thresholds $TH_1, \ldots TH_{n-1}$ may define the upper and lower boundaries of intervals for the degradation index d(t) or health index h(t)=1−d(t) that are associated with the various states $S_1, \ldots S_n$ of the discrete state space. Comparisons to threshold $TH_1, \ldots TH_{n-1}$ may be used when initializing the stochastic simulations for an asset and/or for the updating procedure using the PF.

Additional information about the sensor measurements may be used. For illustration, sensor measurements may be associated with uncertainties. The uncertainties may be caused by sensor quality flaws and/or noise. This information may be taken into consideration by the PF. For illustration, the PF may use a set of parameters that quantify noise in measurement data, without being limited thereto. The parameters may be dependent on and different for the various states of the state model. The parameters may be determined upfront based on, e.g., historical sensor data, and may be used during life operation of the PF.

Figure 8:
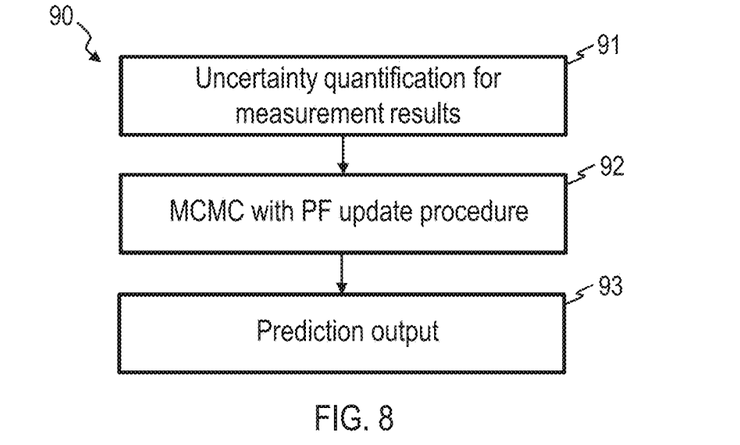
FIG. 8 is a flow chart of a method according to an embodiment.

FIG. 8 is a flow chart of a method 90. The method 90 may be performed automatically by one or several integrated circuits (IC(s)) in the local controllers 21-23, the central system 20, and/or the remote server system 24.

At step 91, an uncertainty quantification associated with measurement data may be performed. This may be done in a training phase prior to use of the PF for updating a prognosis for the evolution of the asset health state.

At step 92, the stochastic simulation may be performed, wherein the prognosis for the evolution of the asset health state is updated based on sensor measurements using a PF.

At step 93, a prediction output, e.g. a RUL or PoF curve, an alarm, warning, or control signal determined based on the prognosis for the evolution as updated using the PF may be output.

For illustration rather than limitation, an expectation value for an observable quantity y may be related to the state of the discrete state space used in the simulation by $$E(y) = \Sigma_{i=1,\ldots,n} p_i(j) \times (0(i) + N(\sigma_i)), \quad (2)$$

where 0(i) may have continuous values, i is an integer from 1, ... n representing a state of the discrete state model, and N is a noise term with a standard deviation $\sigma_i$. The noise term N may be Gaussian white noise centered at 0 with the standard deviation $\sigma_i$. The standard deviation is a parameter that may be dependent on the state of the state model.

During the training at step 91, the standard deviations $\sigma_i$ may be computed for all states of the discrete state space. This may be done by selecting the standard deviations $\sigma_i$ so that a deviation between the observed quantity y and the expectation value E(y) is minimized or, at least, is less than a threshold.

For illustration, the standard deviations $\sigma_i$ may be computed based on training data such that $$\|y(t) - E(y(t))\| \quad (3)$$

is minimized or less than a threshold. In Equation (3), $\|\cdot\|$ represents a norm, such as a L1 norm, L2 norm, or other norm, computed over various times and for the respective predictive states for which the observable quantity is available from measurement data.

In order to make the determination of the standard deviations $\sigma_i$ in accordance with Equation (3) more efficient, all $\sigma_i$ may be constrained such that they are selected from a finite set of values. This allows the standard deviations $\sigma_i$ to be determined using a brute force approach.

The determined standard deviations $\sigma_i$ may subsequently be used by the PF in the update procedure. The determined standard deviations $\sigma_i$ need not be modified during life operation of the PF. For illustration, the PF may use the standard deviations $\sigma_i$ previously determined in an update procedure. In some implementation, the PF may compute an expectation value for an observable quantity corresponding to the most recent stochastic distribution determined by stochastic simulation, using the standard deviations $\sigma_i$, may compare the expectation value to the respective observable determined from the sensor measurements, and may perform the update based on the comparison.

By performing stochastic simulations such as MCMC and updating the stochastic simulations using a PF based on sensor measurements, not only the evolution of the asset's health state, but also the reliability associated with the determined evolution may be automatically determined and output.

Figure 9:
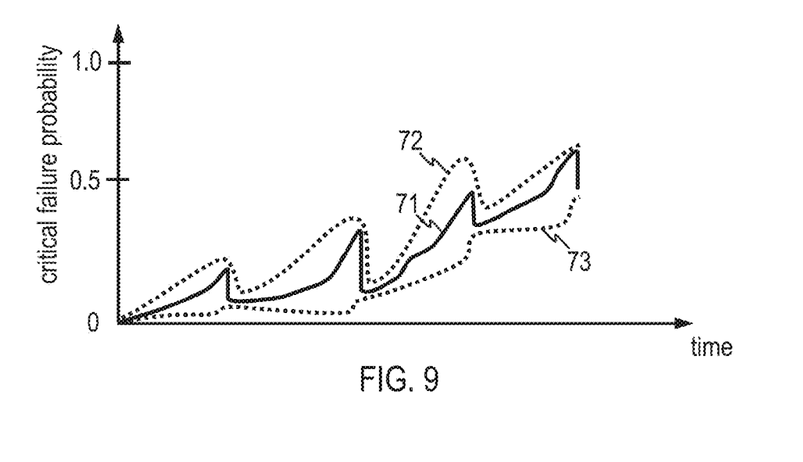
FIG. 9 is a graph illustrating exemplary output generated by a method and computing system according to an embodiment.

The information on the reliability may take various forms. For illustration, an evolution of a confidence interval around the curve 71, 81 may be determined as a function of time over the prognostic time horizon. The time evolution of the confidence interval may indicate a lower boundary and an upper boundary for the critical failure probability 71, for a degradation index d, or for a health index h. The upper and lower boundaries may be determined such that at least a certain percentage (e.g., at least 70%, 80%, 90%, or 95%) of the stochastic simulations as updated by the PF gives rise to a critical failure probability 71, a degradation index d, or a health index h within the range between the upper and lower boundaries. Exemplary upper and lower boundaries 72, 73 indicating the time evolution of the confidence interval are shown in FIG. 9.

Alternatively or additionally, the upper and lower boundaries 72, 73 may reflect the variance in operating and/or ambient conditions to which the asset may be subjected. For illustration, the curves 71, 72, 73 may each be obtained by performing plural stochastic simulations using a Markov Chain model as explained with reference to FIG. 5, but with different sets of transitions probabilities.

The transition probabilities for the stochastic model may be determined in various ways. For illustration, the transition probabilities may be set by a human expert or may be derived from historical sensor data.

The historical sensor data may be data obtained for assets of the same asset type (e.g., photovoltaic panel with a certain power rating range; wind turbine generator with a certain power rating range; transformer of a rating in a certain interval) as the asset(s) for which the prognostic asset health analysis is to be performed.

The historical sensor data may be labeled sensor data that includes information on states, e.g. on states S1-Sn. For illustration, for any set of sensor data, there may be information that associates the sensor data with one of the states S1, . . . , Sn of the Markov Chain model. If the sensor data does not include the failure signatures, information from a human expert may be received, assigning the sensor data to the states S1, . . . , Sn of the Markov Chain model. Alternatively or additionally, a scalar function may be computed from the sensor data, which is representative of the degradation or health index of the respective asset in the fleet. The scalar function may be computed to one or several thresholds to determine the times at which transitions between the S1, . . . , Sn have taken place based on the historical sensor data.

The scalar function may be computed from sensor measurements using heuristics.

The scalar function may take sensor measurements captured at various times as inputs and may process them into a scalar function that represents the observed evolution of asset health, as reflected by the health index h or degradation index d.

Various techniques may be used to compute the scalar function that is used to identify transitions between the discrete states. For illustration, sensor measurements may be compared to a range of operation values. For each sensor measurement outside the range, a penalty may be imposed. Weighted summation or other processing that combines products of a weighting factor for a sensor measurement and a value that depends on the deviation of the sensor measurement from the normal operation value range may be used. The weighting factors are dependent on the respective sensor and indicate the importance of the measurement for asset health.

Tools are known that provide a mapping of sensor measurements into a continuous health or degradation functions for a wide variety of assets, including, without limitation, circuit-breakers, batteries (such as Li-ion batteries), or transformers. For illustration, tools such as the Ellipse APM or RelCare tool process sensor measurements to provide a function having a value in a continuous range and indicating the asset health. Normalization may be used to normalize the health or degradation function to a desired range (such as from 0 to 1).

The techniques disclosed herein allow any health or degradation function to be mapped to the discrete states of the state model, using optional normalization and a threshold comparison.

The transition probabilities of the Markov Chain model may be determined automatically from the sensor data and the associated state labels.

In an exemplary implementation, the transition probabilities may be determined based on conditional probabilities. For illustration, the transition probability at a time j for a transition from the $i^{th}$ state to the $(i+1)^{th}$ state (where $1 \leq i \leq n-1$) may be determined as $$p_{i \to i+1}(j) = \#(x_{j+1} = S_{i+1} \hat{} x_j = S_i) / \#(x_j = S_i). \quad (4)$$

In Equation (4), the numerator represents the number of assets which were in the $i^{th}$ state at time j and transitioned to the $(i+1)^{th}$ state at time j+1. The denominator represents the number of assets which were in the $i^{th}$ state at time j.

The transition probabilities may be set and/or adjusted based on a user input. Averaging or other processing may be performed to obtain the probabilities of a homogeneous Markov Chain model.

When sensor data are available for different groups of assets that have the same asset type (e.g., photovoltaic panel with a certain power rating range; wind turbine generator with a certain power rating range; transformer of a rating in a certain interval), but which were subjected to different operating conditions and/or ambient conditions, the transition probabilities may be determined independently for each of the groups.

The transition probabilities may subsequently be used in a stochastic simulation that is combined with a PF for updating an obtained prognosis.

The obtained prognosis, as updated by the PF based on sensor measurements, may be processes to determine the RUL curve, a PoF curve, or another indicator for the time-dependent degradation of one or several assets.

A control and/or output operation may be automatically performed based on the results of the prognosis for the evolution of the asset health state as updated by the PF.

For illustration, the RUL curve may be output. Information on a time-evolution of a confidence interval or variance may be concurrently output.

Alternatively or additionally, an operating point of the asset may be automatically adjusted by the local controller 21-23 associated with the asset.

Alternatively or additionally, inspection, maintenance, and/or replacement work may be automatically scheduled.

Alternatively or additionally, down-times for inspection, maintenance, and/or replacement work may be automatically scheduled.

Alternatively or additionally, alarms, warnings, or other output may be generated for outputting via an HMI depending on the RUL curve or other prognostic asset health state evolution.

Figure 10:
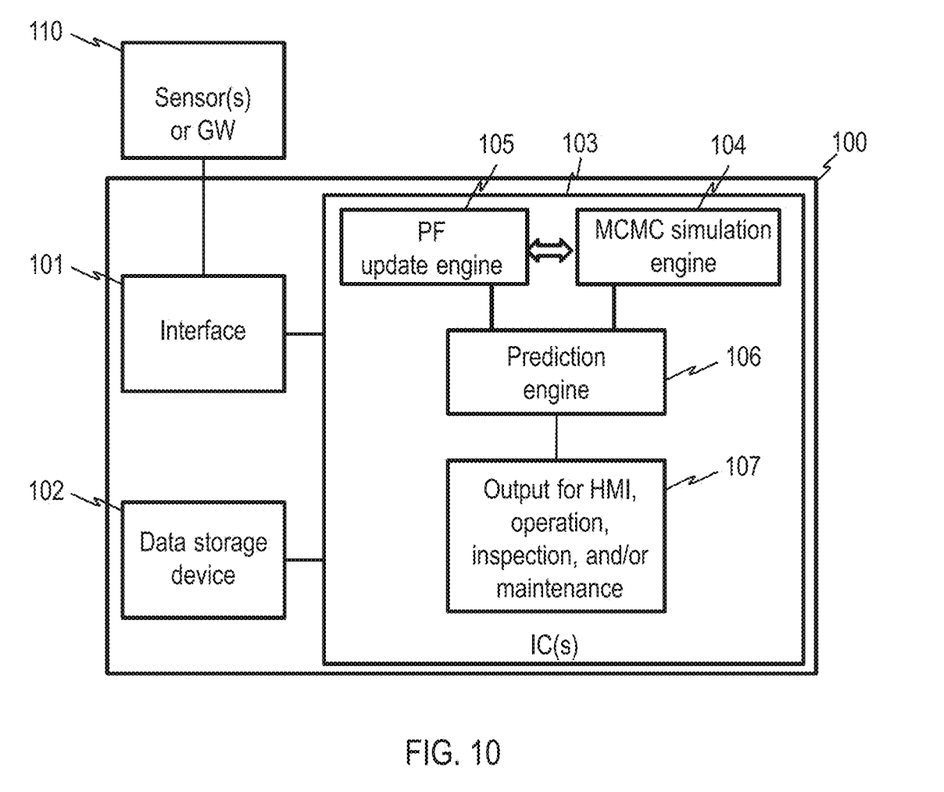
FIG. 10 is a block diagram of a computing system according to an embodiment.

FIG. 10 is a schematic diagram of a computing system 100. The computing system 100 may comprise one or several IC(s) 103. The IC(s) may include an application specific integrated circuits (ASIC), processor, controller, field programmable gate array (FGPA), or a combination of plural such integrated circuits.

The IC(s) 103 may reside in the central system 20, one of the local controllers 21-23, the server system 24, or may be distributed across these entities.

The IC(s) 103 may be operative to execute a stochastic simulation engine 104 to simulate the time-dependent evolution of a Markov Chain model. The stochastic simulation engine 104 may be adapted to perform MCMC simulations.

The transition probabilities for the Markov Chain model used by the stochastic simulation engine 104 may be received via an interface 101 (e.g., when the IC(s) 103 are resident in one of the local controllers 21-23 and the central system 20 computes the transition probabilities). The transition probabilities may be computed by the IC(s) 103 based on historical sensor data for a fleet of assets having the same asset type as the asset for which the prognostic asset health analysis is to be performed. The historical sensor data may be received via the interface 101 or may be stored locally in a data storage device 102.

The IC(s) 103 may be operative to execute a PF update engine 105 to update the prognosis obtained by the stochastic simulation engine 104 based on sensor measurements. The sensor measurements may be received at the interface 101 from sensor(s) 110, a gateway (GW) device, or another entity such as a merging unit (MU).

The IC(s) 103 may be operative to execute a prediction engine 106. The prediction engine 106 may compute a RUL curve, a PoF curve, or other prognostic information associated with an asset health state evolution based on the results of the simulations performed by the stochastic simulation engine 104, as updated by the PF update engine 105.

The IC(s) 103 may be operative to execute an output engine 107. The output engine 107 may generate output data or output signals for controlling an HMI and/or implementing a control operation for the asset or the system in which the asset is being used. For illustration, the output engine 107 may be operative to generate and output data to an HMI such that a RUL curve or a PoF curve is output. The output engine 107 may be operative to generate and output data to the HMI such that information on a time-evolution of a confidence interval or variance may be concurrently output.

Alternatively or additionally, the output engine 107 may be operative to automatically adjust an operating point of the asset in response to the results of the simulations performed by the stochastic simulation engine 104, as updated by the PF update engine 105.

Alternatively or additionally, the output engine 107 may be operative to automatically generate and output information on inspection, maintenance, and/or replacement work.

Alternatively or additionally, the output engine 107 may be operative to automatically generate and output information on down-times for inspection, maintenance, and/or replacement work may be automatically scheduled.

Alternatively or additionally, the output engine 107 may be operative to automatically generate and output alarms, warnings, or other output may be generated for outputting via an HMI depending on the RUL curve or other prognostic asset health state evolution.

Figure 11:
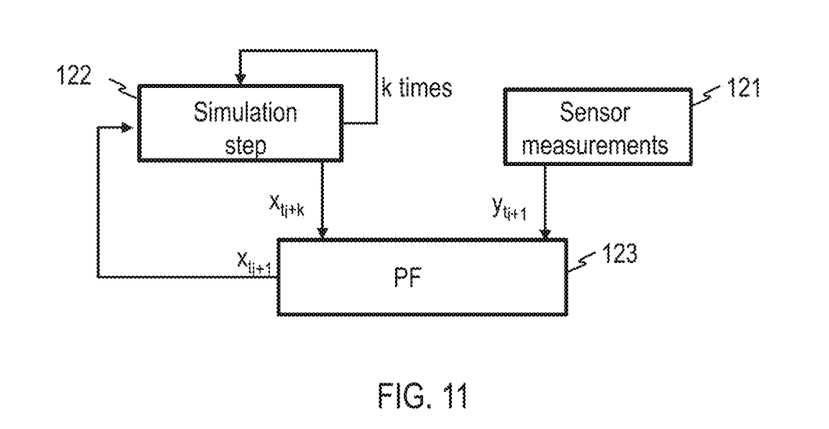
FIG. 11 is a block diagram illustrating processing in a method and computing system according to an embodiment.

FIG. 11 is a schematic block diagram illustrating operation of the method and computing system according to an embodiment. Starting from an initial value $x_{ti}$ for the asset health state (which may be a stochastic distribution over several states of the state space) at a time $t_i$, k stochastic simulation steps 122 are performed to determine a k-step ahead prediction $x_{ti+k}$ for the asset health state.

When sensor measurements 121 become available at time $t_{i+1}$ (which may be equal to $t_i+k$ or which may otherwise fulfill $t_i+k \leq t_{i+1} < t_i+k+1$), a PF 123 may use the k-step ahead prediction $x_{ti+k}$ and the sensor measurements in combination to compute an updated prediction. The updated prediction may be supplied to the next round of computing the k-step ahead predictions.

Various effects and advantages are associated with the invention. The invention provides a novel application of Particle Filter (PF) techniques that allows asset health predictions to be automatically updated when new measurements become available for condition monitoring and failure prediction. Long-short predictions for an asset health state may be obtained thereby. The update of the prognosis may be performed at intervals which may be variable. The automatic update of prognosis with new measurements may be performed even when the measurements are subject to uncertainty, which may be caused by, e.g., sensor quality flaws and/or noise.

The methods and systems according to the invention may be used in association with electric power system assets, such as assets of power generation, distribution and/or transmission systems, or assets of industrial systems, without being limited thereto.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

What is claimed is:

1. A method, the method being performed by at least one integrated circuit and comprising:
   determining a future evolution of an asset health state of an asset, the asset being a power transformer, a distributed energy resource, or a power generator, wherein determining the future evolution of the asset health state of the asset comprises iteratively repeating:
      performing a stochastic simulation to obtain a prognosis for the future evolution of the asset health state, wherein the stochastic simulation uses a model having a discrete state space;
      after performing the stochastic simulation to obtain the prognosis for the future evolution of the asset health state, reading sensor measurements from one or more sensors; and
      updating the prognosis based on the read sensor measurements using a particle filter; and
   generating output based on the determined future evolution of the asset health state; and
   automatically performing an action, wherein the action comprises at least one of scheduling a down-time of the asset based on the determined future evolution of the asset health state, scheduling maintenance work based on the determined future evolution of the asset health state, scheduling replacement work based on the determined future evolution of the asset health state, or changing maintenance intervals based on the determined future evolution of the asset health state,
   wherein the stochastic simulation uses a model having a discrete state space, wherein updating the prognosis comprises:
   computing, based on the prognosis, an expectation value for an observable quantity included in the sensor measurements;
   performing a comparison of the expectation value to the observable quantity included in the sensor measurements; and
   computing an updated initial state for a subsequent iteration of the stochastic simulation based on the comparison.

2. The method of claim 1, wherein the updating is triggered by a reading of the sensor measurements.

3. The method of claim 1, wherein the stochastic simulation uses a model having a discrete Markov Chain model.

4. The method of claim 1, wherein the stochastic simulation comprises a Markov Chain Monte Carlo simulation.

5. The method of claim 1, wherein the discrete state space comprises:

at least one state in which operation of the asset is not adversely affected by a failure;

at least one state in which operation of the asset is adversely affected by a failure, but the asset continues to operate; and a state in which the asset is inoperative due to a failure.

6. The method of claim 1, wherein updating the prognosis comprises mapping the sensor measurements to a scalar function, wherein different ranges of values of the scalar function correspond to different states of the discrete state space.

7. The method of claim 1, wherein the expectation value is computed based on a probability distribution in the discrete state space and state-dependent noise parameters.

8. The method of claim 7, wherein the state-dependent noise parameters are dependent on a variance of a noise term used to compute the expectation value.

9. The method of claim 7, wherein the state-dependent noise parameters are dependent on a state-dependent variance of Gaussian white noise.

10. The method of claim 1, further comprising computing confidence or variance information for the prognosis for the future evolution of the asset health state from the stochastic simulation and updating the confidence or variance information based on the sensor measurements, wherein the output is further generated based on the confidence or variance information.

11. The method of claim 1, further comprising reading the sensor measurements in a cyclic manner and synchronously with completion of a plurality of simulation steps of the stochastic simulation.

12. The method of claim 1, further comprising reading the sensor measurements asynchronously with completion of an integer number of simulation steps of the stochastic simulation.

13. The method of claim 1, wherein the output comprises at least one of:
a representation of the future evolution of the asset health state;
an alarm or warning generated based on the future evolution of the asset health state; or
a control signal to control operation of the asset based on the future evolution of the asset health state.

14. The method of claim 1, wherein the asset is installed in an electric power system or industrial system having a decentralized control system comprising a central control and a plurality of local controllers, each local controller being associated with an asset of the electric power system or industrial system, wherein the method is performed by at least integrated circuit of a local controller of the decentralized control system.

15. A method of operating and/or maintaining an asset, the asset being a power transformer, a distributed energy resource, or a power generator, the method comprising:
determining a future evolution of an asset health state of the asset, comprising iteratively repeating:
performing a stochastic simulation to obtain a prognosis for the future evolution of the asset health state, wherein the stochastic simulation uses a model having a discrete state space;
after performing the stochastic simulation to obtain the prognosis for the future evolution of the asset health state, reading sensor measurements from one or more sensors;
updating the prognosis based on the read sensor measurements using particle filter;
reading the sensor measurements in a cyclic manner and synchronously with completion of a plurality of simulation steps of the stochastic simulation; and
generating output based on the determined future evolution of the asset health state; and
automatically performing an action, wherein the action comprises at least one of scheduling a down-time of the asset based on the determined future evolution of the asset health state, scheduling maintenance work based on the determined future evolution of the asset health state, scheduling replacement work based on the determined future evolution of the asset health state, or changing maintenance intervals based on the determined future evolution of the asset health state.

16. A computing system operative to perform a prognostic health analysis for an asset, the asset being a power transformer, a distributed energy resource, or a power generator, the computing system comprising at least one integrated circuit operative to:
compute a future evolution of an asset health state of the asset by iteratively repeating:
performing a stochastic simulation to obtain a prognosis for the future evolution of the asset health state, wherein the stochastic simulation uses a model having a discrete state space,
after performing the stochastic simulation to obtain the prognosis for the future evolution of the asset health state, reading sensor measurements from one or more sensors,
updating the prognosis based on the read sensor measurements using a particle filter; and
reading the sensor measurements in a cyclic manner and synchronously with completion of a plurality of simulation steps of the stochastic simulation;
control generation of output based on the future evolution of the asset health state; and
perform an action, wherein the action comprises at least one of scheduling a down-time of the asset based on the computed future evolution of the asset health state, scheduling maintenance work based on the computed future evolution of the asset health state, scheduling replacement work based on the computed future evolution of the asset health state, or changing maintenance intervals based on the computed future evolution of the asset health state.

17. The computing system of claim 16, wherein the stochastic simulation uses a model having a discrete state space comprising at least one state in which operation of the asset is not adversely affected by a failure, at least one state in which operation of the asset is adversely affected by a failure, but the asset continues to operate, and at least one state in which the asset is inoperative due to a failure.

18. An electric power system or industrial system, comprising:
the asset; and
the computing system of claim 16, the computing system configured to perform a prognostic asset health analysis for the asset.

19. The electric power system or industrial system of claim 18, wherein the computing system comprises a local controller of the electric power system or industrial system, local controller configured to control the asset.

20. The computing system of claim 16, wherein updating the prognosis comprises:
computing, based on the prognosis, an expectation value for an observable quantity included in the sensor measurements;

performing a comparison of the expectation value to the observable quantity included in the sensor measurements; and computing an updated initial state for a subsequent iteration of the stochastic simulation based on the comparison.

21. The method of claim 15, wherein updating the prognosis comprises:

computing, based on the prognosis, an expectation value for an observable quantity included in the sensor measurements;

performing a comparison of the expectation value to the observable quantity included in the sensor measurements; and computing an updated initial state for a subsequent iteration of the stochastic simulation based on the comparison.

* * * * *